(No Model.)
C. R. ORD.
PRESSURE REGULATOR.
No. 492,100. Patented Feb. 21, 1893.
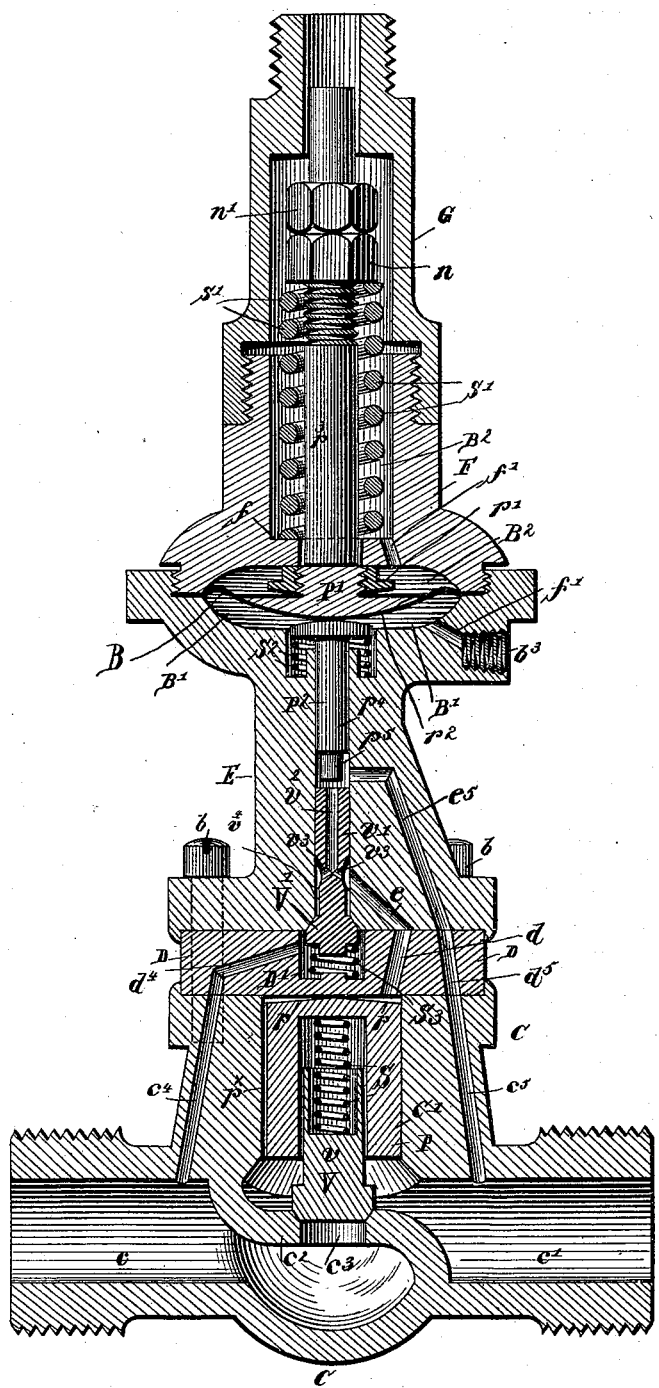
Witnesses:
H. G. Dieterich
P. W. Sommers
Inventor:
Craven R. Ord,
By Henry Ord
Atty.

UNITED STATES PATENT OFFICE.

CRAVEN ROBERT ORD, OF ONTARIO, CANADA.

PRESSURE-REGULATOR.

SPECIFICATION forming part of Letters Patent No. 492,1C0, dated February 21, 1893.

Application filed October 20, 1891. Renewed January 7, 1893. Serial No. 457,649. (No model.) Patented in England December 2, 1890, No. 19,675.

*To all whom it may concern:*

Be it known that I, CRAVEN ROBERT ORD, a subject of the Queen of Great Britain, residing at Ontario, in the Province of Ontario, Dominion of Canada, have invented certain new and useful Improvements in Pressure-Regulators, (for which I have obtained Letters Patent in England, dated December 2, 1890, No. 19,675;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to a pressure regulator constructed and adapted to control the operation of a valve or other device having a like function, as for instance, the valve of a fluid forcing apparatus, in accordance with the pressure of the fluid forced by said apparatus, the latter remaining in operation as long as the pressure of the fluid forced does not exceed a definite predetermined pressure.

In regulators of this character especially when applied to the air pump that supplies compressed air to the air brakes of railway trains it is of the utmost importance that the regulator should not only respond instantly to variations in the pressure of the air exceeding the definite predetermined pressure but that it should so respond under all conditions of use. I have found that in pressure regulators in which the main valve is controlled by the pressure of the fluid forced by the forcing apparatus usually through the medium of a piston or valve, if the latter fails in its operation from any cause serious results may ensue especially in the application of the regulator to air brakes. It is well known that it is almost impossible to prevent dirt from gaining access to the pressure controlled piston or valve and that such dirt is liable to impair the function of said piston or valve.

My present invention which is an improvement on that shown and described in Letters Patent of the United States, No. 442,492, granted to me December 9, 1890, is designed to obviate this difficulty and has for its object the provision of means whereby the controlling devices are made more sensitive to pressure variations above a definite predetermined pressure, and the provision of means whereby the function of the regulator is not impaired should the valve or piston controlled by the pressure of the fluid forced and controlling the motive fluid fail in its operation.

The apparatus comprises a main valve adapted to control the motive fluid supplied to the engine of the forcing apparatus; a main valve actuating piston operated by the motive fluid and having motion with as well as independently of the main valve; a controlling device of a predetermined power acting upon the main valve and its actuating piston in opposition to the motive fluid, a controlling piston working in a pressure chamber and operated by the fluid forced by the forcing apparatus; a valve adapted to control the operation of the main valve actuating piston and controlled by the controlling device, and an intermediate auxiliary piston adapted to control the operation of the main valve actuating piston should the valve controlled by the pressure of the fluid forced fail in its operation.

The invention also comprises structural features and combinations of parts as will hereinafter be fully described. The main valve actuating piston is cylindrical and of greater cross-sectional area than the main valve, hence the two elements are differential, said main valve having one of its faces constantly exposed to the action of the incoming motive fluid independently of the position of its actuating piston, while the latter works in a cylinder on the outlet side of the main valve port to which cylinder the motive fluid on said outlet side has access and is therefore acted upon at both ends by the motive fluid of less pressure on said outlet side of the main valve port, when open, said motive fluid of less pressure acting also on the opposite face of the main valve. The cylinder for the actuating piston has an inlet in communication with the inlet side of the main valve port which inlet passage is governed by a controlling device. The latter device is acted upon in one direction tending to close the passage, by a pre-determined power such as a spring or springs, and in the other direction tending to open said passage, by the pressure of the fluid forced whenever said pressure is sufficient to overcome the resistance exerted by the predetermined power, thereby admitting the motive fluid of greater pressure at the inlet side of the main valve port to one end of the piston cylinder which overcoming the lower pressure at the outlet side of the main valve port acting upon both ends of said piston and the pressure of the motive fluid upon the smaller face of the main valve, causes said piston to move toward the seat of the main valve. This movement of the piston causes the main valve to move also toward or to its seat, thereby regulating the flow of motive fluid to the engine of the forcing device or apparatus.

The cylinder for the main valve actuating piston opens into the outlet side of the main valve port, and said piston does not work fluid tight in its cylinder, and the main valve stem works freely in a bearing formed in the piston so as to admit the motive fluid of less pressure at the outlet side of the main valve port when open to said bearing, whereby the pressure upon opposite faces of the cylinder is equalized. The cylinder and main valve being both acted upon by a definite predetermined force such as that of a spring interposed between the main valve and its actuating piston in antagonism to the pressure of the motive fluid.

The operation of the main valve and its actuating piston depends upon two conditions, namely, the differential pressure on opposite sides of the port controlled by the main valve due to the weight of the piston and valve, and the power exerted by the spring in antagonism to the pressure of the motive fluid and the greater pressure of the motive fluid on the inlet side of the main valve port when acting upon one side of the piston, thus rendering the latter more sensitive to pressure variations, and its operation more positive than is the case in those regulators in which the pressure on the inlet and outlet side of the main valve is the same. The auxiliary piston and the controlling valve operate in a cylinder or chamber in communication with a chamber open to the atmosphere and with the outlet side of the main valve port, so that the motive fluid may be exhausted into said outlet side should the controlling valve fail to cut off such motive fluid from the piston cylinder, and so that any motive fluid that may leak along the auxiliary piston at any time during the operation of the regulator may exhaust into the chamber and thence into the atmosphere.

In the accompanying drawings I have illustrated my improved pressure regulator by a central vertical sectional elevation. The regulator shown in the drawings is adapted to control a fluid forcing apparatus, as for instance, an air pump operated by a steam engine, and in said drawings, C, indicates the main valve shell or casing having inlet and outlet branches, $c$, and $c'$, adapted for connection with a supply pipe leading from a steam generator, and with a pipe leading to the engine of the pump, respectively. The inlet and outlet branches are separated by a partition, $c^2$, in which is formed a port, $c^3$, having a valve seat for the main valve, V. The main valve casing has a cylindrical axial through passage, C', in which is fitted the main valve actuating-piston, P, that has itself a cylindrical axial bore or socket that serves as a guide for the stem, $v$, of the main valve, V, whose area constantly exposed to the action of the motive fluid of greater pressure from the inlet side of the main valve port is less than the area of its actuating piston, P. The main valve stem, $v$, has a socket formed in its end in which socket is seated a coiled spring, S, that exerts its power on the main valve, V, in one direction, and the valve actuating piston, P, in a reverse direction, said main valve piston having its upper face, $p$, preferably made slightly convex so that when the steam is admitted to the upper end of the cylinder, C', in which the piston works, said steam will be uniformly distributed over the upper face, and, as hereinbefore stated, the said piston does not work fluid tight in its cylinder, so that the steam of less pressure at the outlet side of the main valve port will have access to the upper end of the piston when the main valve is off its seat.

In the casing, C, are formed two through passages or ducts, $c^4$, and $c^5$, opening into the inlet and outlet branches respectively, and the upper face of the said main valve shell is recessed for the reception of a disk, D, that constitutes the cap or cover for the piston cylinder, C'. The cap, D, has an axial cylindrical valve chamber, D', that communicates by a passage, $d^4$, with the passage, $c^4$, in the main valve casing, C, and consequently with the inlet branch, $c$, thereof, and in said disk are formed two through passages, $d$, and $d^5$, the latter being in communication with the passage, $c^5$, in casing, C, that leads to the outlet branch, $c'$, of said casing.

On the disk, D, is seated the cylinder, E, for the auxiliary valve, V', and auxiliary piston, $P^2$, the underside of said cylinder being recessed for the reception of the upper face of the cap, D, as shown, said parts being bolted together and to the main valve casing, C, by means of bolts, $b$, passing therethrough and screwing into said casing. The cylinder, E, has its upper end dished or made flaring outwardly, and to said dished end is screwed the upper casing, F, whose lower end is likewise dished or made flaring outwardly, whereby a pressure chamber, B', is formed by said dished or flaring portions of the cylinder, E, and casing, F. To the casing, F, is screwed a coupling, G, for connection with the delivery pipe or reservoir for the air forced by the pump.

In the pressure chamber, B', is arranged a diaphragm B, whose edges are clamped between the flaring ends of cylinder, E, and casing, F, to divide the chamber, B', into two chambers, and said diaphragm is secured by means of a nut, $p'$, to the controlling piston, P', that has a convex head, $p^2$. The rod, $p^3$, of piston, P', passes freely through the opening formed in the lower face of the casing, F. As shown, the controlling piston is held in a normal elevated position by a definite pre-determined power or force, namely a spring, S', on the rod, $p^3$, of piston, P', one end of said spring abutting against the partition, $f$, and the other against an adjusting nut, $n$, on said piston rod, $p^3$, a jam nut, $n'$, being preferably employed to lock the adjusting nut, $n$, against accidental displacement. The air chamber, $B^2$, formed above the partition, $f$, is in perpetual communication with the pressure chamber, B', above the diaphragm, B, through one or more ports or passages, $f'$, and said chamber, B', has an outlet, $b^3$, below said diaphragm for the eduction of such motive fluid as may leak along the auxiliary piston, $P^2$, or for the eduction of any water of condensation that may collect therein arising from the condensation of steam.

In the axial bore of the cylinder, E, slides freely the auxiliary piston, $P^2$, whose upper face is convex and upon which convex face the piston, P', has bearing, the piston, $P^2$, being held in contact with the controlling piston, P', by a coiled spring, $S^2$, having bearing on its underside and being seated in a suitable recess formed about the upper end of the axial bore of cylinder, E. The stem, $p^4$, of the auxiliary piston, $P^2$, has its lower end, $p^5$, of reduced diameter and performs the function of a valve, as will be presently explained. The axial bore of the cylinder, E, is in communication with the outlet branch, $c'$, of the main valve casing, C, through the passages, $c^5$, $d^5$, in said casing and in disk, D, respectively, and a passage, $e^5$, formed in said cylinder, E, and said axial bore of the cylinder, E, is in communication with the upper end of the cylinder for the main valve actuating piston, P, and the inlet branch, $c$, of casing, C, through the passage, $d$, in disk, D, a passage, $e$, formed in the cylinder, E, and the passages, $d^4$, and $c^4$, in said disk, D, and the casing, C, respectively, when the controlling valve, V', is off its seat.

The admission of the steam to the upper end of the main valve controlling piston cylinder, C', is controlled by the pressure of the fluid forced by the pump through the piston, P', acting upon the auxiliary piston, $P^2$, and through the latter acting upon the controlling valve, V', that has its seat at the lower end of the axial bore of the cylinder, E, said valve being held to its seat by a coiled spring, $S^3$, in the valve chamber, D', formed in disk, D, and hereinbefore referred to. A portion of the stem, $v'$, from the valve, V', upward has longitudinal grooves, $v^4$, that communicate with the upper tubular portion, $v^2$ of the stem through a circumferential groove and the ports, $v^3$, therein.

In the construction of the apparatus I prefer, as hereinabove stated, to employ a separate cap or cover, D, for the main valve shell, C, because it is easier to true the contacting faces and to drill the steam passages, so that the construction of the apparatus is facilitated. On the other hand, ready access may be had to the piston cylinder, the auxiliary piston, the auxiliary valve, the fluid ducts and diaphragm by removal of coupling, G, cylinder, E, and casing, F, from each other and from casing, C, whereby the entire apparatus is dismembered.

The operation of the apparatus is as follows: The drawings show the co-operating devices in their normal positions, it being supposed that the pressure of the fluid forced by the pump has been reduced by the closure of the main valve, that the controlling piston, P', the auxiliary piston, $P^2$, and the valve, V', have been returned to their normal position by their respective springs S', $S^2$, and $S^3$, and that the steam is being exhausted by escaping along the actuating piston, P, or the longitudinal peripheral channel therein into the outlet branch, $c'$. As soon as the pressure of the motive fluid on the upper end of the piston, P, has been reduced sufficiently to be overcome by the constant pressure of said fluid upon the main valve, V, said valve is moved off its seat against the stress of the spring, S, and as the pressure at opposite ends of the piston, P, equalizes, said spring, S, moves the piston out of contact with the main valve, V, into the cylinder, C', and said main valve assumes its proper position, the steam flowing freely to the engine of the pump to again start the same. As soon as the pressure in the fluid chamber, $B^2$, and pressure chamber, B', is sufficient to overcome the power exerted by the springs, S', $S^2$, and $S^3$, on the controlling piston, P', the auxiliary piston, $P^2$, and valve, V', respectively, the two pistons, P', $P^2$, will move downward, the reduced end, $p^5$, of the stem, $p^4$, of piston, $P^2$, seating on the open end of the tubular portion of the stem, $v'$, of valve, V', closing the outlet thereof, and consequently the communication with the exhaust passage, $e^5$, $d^5$, $c^5$. As the pressure in the chambers, $B^2$, B', increases the pistons, P', $P^2$, descend, carrying with them the valve, V', which is unseated. This movement of valve, V', is very slight, so that the ports, $v^3$, in the stem, $v'$, thereof are in practice in perpetual communication with the passage, $e$, $d$, leading to the upper end of piston cylinder, C'. The unseating of the valve, V', admits the steam from the valve chamber, D', to the upper end of said cylinder, C', and owing to the fact that the pressure at the inlet side of the main valve port is greater that at the outlet side the motive fluid of greater pressure admitted above the piston, P, will destroy the equilibrium and said piston will at once move down and compress the spring, S, which acting upon the main valve, V, moves the same toward its seat, thereby reducing the volume of steam passing through the main valve port and still further reducing the pressure on the outlet side of said port below the actuating piston, causing the same to impinge upon the main valve and quickly move the same to its seat and stop the operation of the pump by cutting off the supply of steam to the engine. As the main valve actuating piston, P, does not work fluid tight in the cylinder, the motive fluid gradually escapes into the outlet branch, $c'$, yet not sufficient to materially reduce the pressure of such fluid above said piston. As soon as the pressure of the fluid forced by the pump has been reduced by the stoppage of its operation to such a degree as to be overcome by the definite predetermined force, the controlling and auxiliary pistons are moved upwardly again by said force, namely their respective springs, $S'$, and $S^2$, the valve, $V'$, following this movement under the stress of its spring, $S^3$, thereby reducing the supply of steam to the upper end of cylinder, $C'$, and consequently the pressure upon said cylinder, so that the main valve, V, will be forced off its seat by the greater pressure in the inlet branch, $c$, the actuating piston, P, being moved into its cylinder by the spring, S, the motive fluid exhausting into the exhaust branch, $c'$, along the periphery of the actuating piston, as above stated, until the controlling valve, $V'$, reaches its seat to cut off all supply of motive fluid to the piston cylinder, $C'$, and until the pressures above and below the piston, P, are equalized. The pressure of the fluid forced by the pump having been reduced to a normal predetermined pressure, and the auxiliary piston, $P^2$, and the controlling piston, $P'$, having been returned to their normal positions the end of valve stem, $v'$, of the controlling valve, $V'$, will be uncovered. Should the controlling valve, $V'$, fail from any cause to cut off the motive fluid from the cylinder, $C'$, the described operation would not take place unless means are provided to avoid such failure of operation. This I accomplish by the construction, relative arrangement and co-operation of the controlling valve, $V'$, auxiliary piston, $P^2$, and exhaust passage, $e^5$, $d^5$, $c^5$. It will readily be seen that should valve, $V'$, fail to cut off the motive fluid from, $e$, $d$, said motive fluid coming from passage, $c^4$, $d^4$, into valve chamber, $D'$, from the inlet branch, $c$, will flow past the valve, $V'$, along its stem, through the upper tubular portion thereof, which as above stated, is not then closed by the auxiliary piston, $P^2$, and thence into the outlet branch, $c'$, by passage, $e^5$, $d^5$, $c^5$.

In view of the free communication between chamber, $D'$, and the outlet side of the main valve port, it is evident that should valve, $V'$, fail to cut off the communication between the piston cylinder and valve chamber, $D'$, none, or at least but a very small quantity of the steam from said chamber, $D'$, will reach the cylinder, $C'$, never enough to have any influence upon the piston, P, nor will this steam be lost, since it merely passes by a circuitous duct from the inlet branch, $c$, to the outlet branch, $c'$, of the main valve casing, C. Nor can the failure of the controlling valve, $V'$, to properly seat therefore impair the function of the regulator, which is not the case in any regulator with which I am acquainted, because the moment the pressure in the chamber, $B'$, is sufficient to overcome the definite predetermined pressure, the controlling and auxiliary pistons will move down under this pressure, the valve, $p^5$, will close the end of the tubular portion of the stem, $v'$, of the controlling valve, $V'$, and acting upon the same will force said valve completely off its seat, thus again admitting the motive fluid to the upper end of the cylinder, $C'$, of the main valve controlling piston, P, to operate the same to close the port, $c^3$, through the medium of the main valve, V. Such motive fluid as may leak along the auxiliary piston, $P^2$, will pass into the pressure chamber below the diaphragm, B, and thence through exit, $b^3$, into the atmosphere, but it will be seen that no escape of motive fluid to the atmosphere is required for the operation of the regulator, which is one of the novel features of this invention.

The spring, S, interposed between the main valve and its operating piston is also a novel feature of my invention, and constitutes a predetermined definite force operating in antagonism to the motive fluid acting on the piston, P, and valve, V, and to all intents and purposes the said motive fluid constitutes both abutments for the spring and cushions the same or the parts operated thereby, thus avoiding sudden impacts of the valve with its seat, or of the piston with the cylinder cap. On the other hand, the power exerted by the spring, S, tends materially to increase the pressure on the inlet side of the main valve port, and to correspondingly reduce the pressure on the outlet side of said port whereby the operation of the controlling devices is rendered more sensitive to variable pressure. Although the pressure on the inlet side of the main valve port is greater than on the outlet side, it is comparatively slight as compared with the high pressures usually carried in steam generators, the required difference not exceeding two or three pounds.

When the regulator controlling devices are in their normal position the main valve port being fully open, the pressure on opposite sides of the piston, P, is substantially the same owing to the fact that the said piston does not work fluid tight in its cylinder, the motive fluid having access to the upper end of the cylinder, $C'$, where there is more or less space, due to the convex upper face of the piston, P. It may therefore be said that the main valve, V, and its actuating piston, P, are held in equilibrium, and as the pressure upon the actuating piston and the upper face of the main valve is considerably less than the pressure at the inlet side of the main valve port, the piston, P, becomes extremely sensitive to any variations in such pressure, which variations are intensified by any movement of the piston, since its area is greater than that of the main valve, V.

I have hereinbefore stated that the main valve actuating piston, P, does not work fluid tight within its cylinder, C'. In practice I prefer to so construct these parts as to make a good working fit between the piston and cylinder, and I provide the former with a very narrow longitudinal peripheral groove, $p^x$, thus placing the outlet side of the valve port in communication with the upper end of the cylinder, C'.

Having thus described my invention, the following is what I claim as new therein and desire to secure by Letters Patent—

1. The combination with a cylinder open at one end, a differential piston valve therein, the differential areas of which are exposed to motive fluid of different pressures, and means whereby motive fluid of greater pressure is admitted into the closed end of the cylinder and the motive fluid of less pressure therein; of a valve controlling said admission, and an actuating device for said controlling valve acted upon in one direction by a variable fluid pressure and in the other by a predetermined governing force.

2. The combination with a cylinder open at one end, a piston therein, and a valve having motion with and independently of the piston, said valve having a less area than the piston, the differential areas of valve and piston being exposed to motive fluid of different pressure, and means for admitting motive fluid of greater pressure into the closed end of the cylinder and the motive fluid of less pressure therein, of a valve controlling said admission, and an actuating device for said controlling valve acted upon in one direction by a variable fluid pressure and in the other by a predetermined governing force, for the purpose set forth.

3. The combination with a cylinder open at one end, a piston therein, and a valve having motion with and independently of the piston, said valve having a less area than the piston, the differential areas of the valve and piston being exposed to motive fluid of different pressure, a controlling device, as a spring, acting upon the valve and piston to move the same in opposite directions, and means for admitting motive fluid of greater pressure into the closed end of the cylinder and the motive fluid of less pressure therein; of a valve controlling said admission and an actuating device for said controlling valve acted upon in one direction by a variable fluid pressure and in the other by a predetermined governing force, for the purpose set forth.

4. The combination with a cylinder, a differential piston valve therein having its smaller cross sectional area constantly exposed to the pressure of the motive fluid, an inlet for the motive fluid to the cylinder and to the greater area of the piston, and an outlet from said cylinder; of a valve controlling the inlet, an auxiliary valve controlling the outlet, and an actuating device for the said valves acted upon in one direction by a variable fluid pressure and in the other direction by a predetermined governing force, for the purposes set forth.

5. The combination with a fluid duct divided by a partition into inlet and outlet ducts, a valve port in said partition, a cylinder opening into the outlet duct, a differential piston valve working in said cylinder and having its smaller area constantly exposed to the pressure of the fluid, said piston valve controlling the passage of the fluid through the valve port, and fluid passages leading from the inlet and outlet ducts to the cylinder and to the larger area of the piston; of a valve controlling the flow of fluid through said passages, a pressure chamber and an actuating device for said valves therein acted upon in one direction by a variable fluid pressure and in the other direction by a predetermined governing force, for the purposes set forth.

6. The combination with a fluid duct divided by a partition into inlet and outlet ducts, a valve port in said partition, a cylinder opening into the outlet duct, a piston therein controlled by the pressure of the fluid in the inlet duct, and a valve working in and acted upon by the piston and controlling the passage of the fluid from the inlet to the outlet duct; of a controlling device controlling the pressure of the fluid on one end of the piston and acted upon in one direction by a variable pressure and in the other by a predetermined controlling force, for the purposes set forth.

7. A valve casing having inlet and outlet openings and a partition between them provided with a valve port, a piston cylinder in said casing opening into the outlet, a piston working in said cylinder acted upon in one direction by the motive fluid at the inlet side of the valve port, a valve of less cross sectional area than that of the piston controlling the fluid passing from said inlet side to the outlet side of said port and acted upon in one direction by the piston, and a predetermined controlling force acting upon the valve and its actuating piston in antagonism to the motive fluid, in combination with a controlling valve governed by the pressure of the the fluid forced and governing the action of the motive fluid from the inlet side of the valve port upon the piston, for the purposes set forth.

8. The combination with the main valve casing having inlet and outlet branches divided by a partition in which is formed a valve port, a cylinder in said casing, the piston, P, in said cylinder, the main valve, V, in the piston, the spring, S, interposed between said valve and piston, a valve chamber, a controlling valve therein having a stem the upper portion of which is tubular, having longitudinal channels formed in the periphery of its lower portion, said channels communicating with said tubular portion and said stem working in a cylinder having a valve seat for said controlling valve, a passage leading from said valve cylinder to the upper end of the piston cylinder, a like passage leading from the inlet of the main valve casing to the chamber of the controlling valve and an exhaust passage leading from the cylinder of said controlling valve to the outlet branch of the said main valve casing; of a controlling device acted upon in one direction by a variable pressure and in the other by a predetermined governing force, and an auxiliary piston acted upon by said controlling device in one direction and in the other by a predetermined controlling force, said auxiliary piston controlling the exhaust passage and the controlling valve, for the purposes set forth.

CRAVEN ROBERT ORD.

Witnesses:
    GRACE ORD,
    LUCY LEHRLE.